United States Patent [19]
Larry

[11] 4,092,083
[45] May 30, 1978

[54] GUN DRILL

[75] Inventor: George A. Larry, Farmington, Mich.

[73] Assignee: Star Cutter Company, Farmington, Mich.

[21] Appl. No.: 768,686

[22] Filed: Feb. 15, 1977

[51] Int. Cl.² .............................................. B23B 51/06
[52] U.S. Cl. ......................................... 408/59; 407/11
[58] Field of Search .................... 408/59, 226, 230, 57; 29/103 A

[56] References Cited

U.S. PATENT DOCUMENTS

| | | | |
|---|---|---|---|
| 619,450 | 2/1899 | Turton | 408/59 |
| 2,575,239 | 11/1951 | Stephens | 408/226 |
| 3,010,345 | 11/1961 | Wagner | 408/59 |
| 3,054,308 | 9/1962 | Larry | 408/59 |

*Primary Examiner*—Leonidas Vlachos
*Attorney, Agent, or Firm*—Olsen and Stephenson

[57] ABSTRACT

A gun drill for forming a hole in a metal workpiece consisting of a generally cylindrical body having a shank portion and a tip portion. The body has a longitudinally extending groove formed in its outer surface which extends the full length of the tip portion, and the terminal end of the tip portion has a single cutting edge which extends radially through the axis of the tip portion adjacent the terminal end of the groove. The tip portion is formed intermediate its ends with a wall section located to one side of the groove and in substantial alignment with the cutting edge in a direction longitudinally of the body. A pair of fluid passages are formed in the body, one terminating at the wall section in an orifice directed toward the cutting edge, and the other terminating in an orifice located in the terminal end of the tip portion in a spaced relation with the cutting edge. Fluid discharged through the orifices acts to flush metal chips removed from the workpiece by the cutting edge into the groove for reverse flow out of the hole being drilled. An inclined surface is formed on the tip portion extending in a direction axially of the drill from the wall section rearwardly toward the shank portion to further facilitate fluid flow and chip flushing at the tip portion of the drill.

5 Claims, 6 Drawing Figures

GUN DRILL

BACKGROUND OF THE INVENTION

This invention relates generally to gun drills and particularly to gun drills of the type shown in applicant's prior U.S. Pat. No. 3,054,308. Drills of the type shown in applicant's prior patent have performed satisfactorily for many years. However, in drilling into some metals, there is a tendency for the metal to break into stringy chips which tend to plug the drill. The stringy chips tend to accumulate in a pocket formed at the terminal end of the drill, and then plug up the fluid discharge orifice in the tip portion of the drill, ultimately causing the drill to break. It is an object of the present invention, therefore, to provide an improved drill of this type which will not readily plug up and will provide for intense activity of the cooling fluid so as to improve the drill from the standpoints of both hole drilling accuracy and prolonged service life.

SUMMARY OF THE INVENTION

The gun drill of this invention consists of a generally cylindrical rotatable body having a shank portion and a tip portion and a longitudinally extending groove formed in the outer surface of the body so as to extend the full length of the tip portion. The terminal end of the tip portion has a single cutting edge which extends substantially radially of the tip from one side surface through the axis of the tip so that all of the metal is removed from the hole being formed. The tip portion is formed intermediate its ends with a wall section located to one side of the groove and in general alignment with the cutting edge in a direction longitudinally of the drill body. A fluid passage is formed in the body terminating at the wall section in a first fluid discharge orifice positioned so that when the fluid is discharged therefrom it is directed across the cutting edge so as to flush metal chips removed from the workpiece by the cutting edge into the groove for rearward flow therein out of the hole being formed.

The tip portion has a surface inclined in a direction axially of the drill and extending from the wall section at a location radially outwardly of the fluid discharge orifice toward the shank portion to enable chips to be flushed across the inclined surface into the groove. The inclined surface cooperates with the surface of the hole being formed by the drill to form a relief passage communicating with the pocket formed in the drill between the cutting edge and the discharge orifice so as to prevent chips from packing the pocket and plugging the discharge orifice so as to endanger the tool.

The terminal end of the tip portion has angularly related surfaces which intersect at a longitudinally outwardly projecting point on the cutting edge located to one side of the tip axis so that during drilling of a hole an annular groove is formed in the workpiece at the inner end of the hole. A second fluid passage formed in the body terminates in the terminal end of the tip portion in one of the angularly related surfaces in a second fluid discharge orifice aligned with the groove in a direction longitudinally of the drill body. This arrangement provides for the cutting edge of the drill and the second orifice being in continuous fluid communication through the groove formed in the workpiece. This increases the activity of the fluid in the pocket at the cutting edge of the drill to further insure flushing of chips out of the pocket and into the groove formed in the drill body. This intense fluid activity and the provision for continuous flushing of chips out of the drill pocket provides for improved hole drilling accuracy and tool life.

Further objects, features, and advantages of the invention will become apparent from the following description, when taken in connection with the appended claims and the accompanying drawing, in which;

Figure 1:
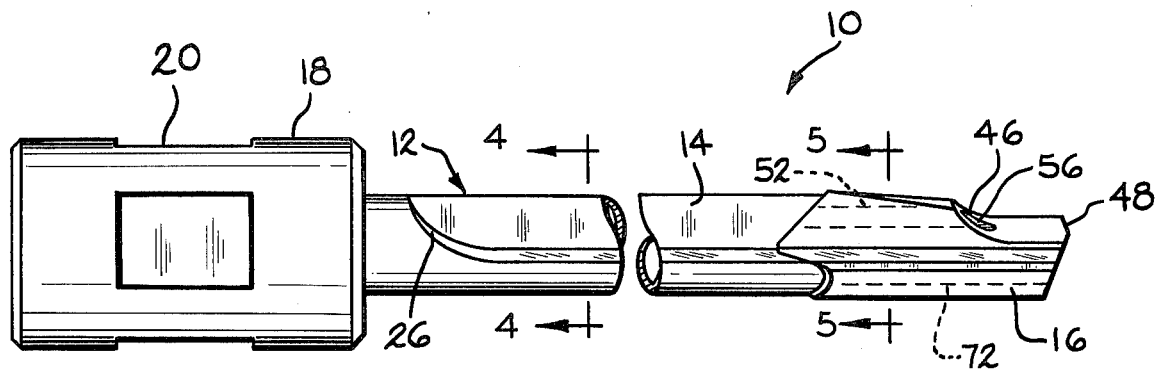
FIG. 1 is a foreshortened side elevational view of the gun drill of this invention.
Figure 6:
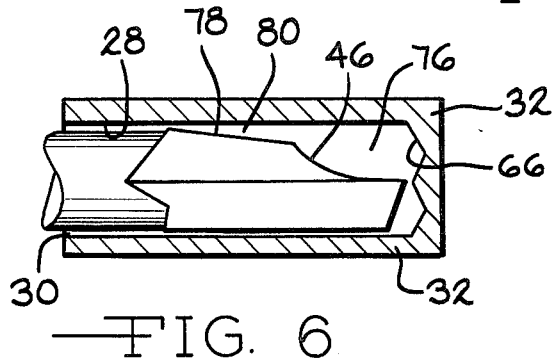
Figure 4:
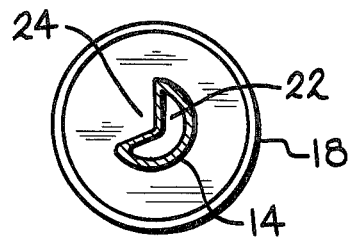
Figure 5:
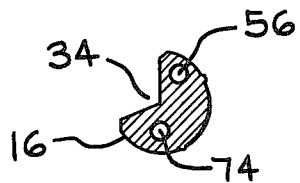

FIGS. 4 and 5 are transverse sectional views of the gun drill of this invention as seen from substantially the lines 4—4 and 5—5, respectively, in FIG. 1; and FIG. 6 is a fragmentary side elevational view of the drill showing the drill forming a hole in a workpiece which is shown in section.

With reference to the drawing, the gun drill of this invention, indicated generally at 10, is illustrated in FIG. 1 as consisting of a drill body 12 having a shank portion 14 and a tip portion 16. The tip portion 16 is preferably formed of a hard wear-resistant material, such as a hard steel or suitable metallic carbide, and is suitably secured to one end of the shank protion 14. The shank portion 14 is formed of a suitable metal and is provided at its opposite end with an enlarged mounting member 18 having flat surface portions 20 formed in its periphery for adapting the member 18 for attachment to a machin (not shown) capable of rotating the drill 10 or holding the drill 10 for engagement with a rotating workpiece. The member 18 forms no part of the present invention and may be of any desired shape for adapting the drill 10 for attachment to the particular machine or tool in which it is to be mounted.

The shank portion 14 of the drill 10 is of a tubular shape having an elongated passage 22 (FIG. 4) therein which extends the full length of the shank portion 14 and communicates with a fluid supply passage (not shown) in the mounting member 18. The shank portion 14 may be readily formed from a tubular body which is creased or deformed to form the body with a longitudinally extending V-shape passage or groove 24 in its external surface. The groove 24 extends substantially the full length of the shank portion 14 and terminates at an inclined crease 26 formed adjacent the mounting member 18.

Figure 2:
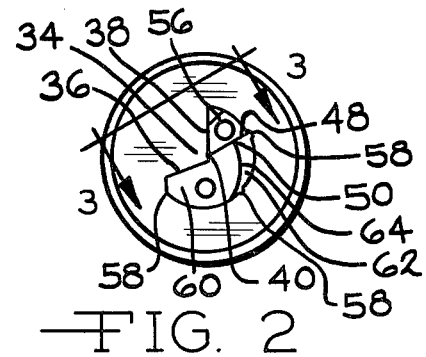
FIG. 2 is an end view of the drill shown in FIG. 1.
Figure 3:
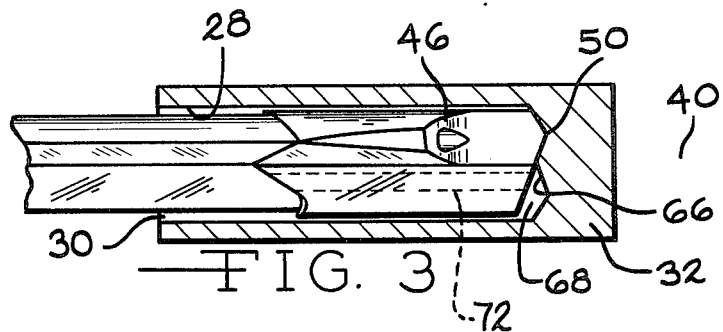
FIG. 3 is a fragmentary plan view of the working end portion of the gun drill of this invention, illustrating the drill in a position forming a hole in a workpiece shown in section.

The tip portion 16 is also of generally cylindrical shape and is of a larger diameter than the shank portion 14 so that the shank portion 14 will be in a clearance relation with the side wall 28 of the hole 30 being drilled in a workpiece 32 during use of the drill 10, as shown in FIGS. 3 and 6. A groove or passage 34, of generally V-shape (FIGS. 2 and 5) and corresponding in shape substantially to the shape of the groove 24 in the shank portion 14, extends the full length of the tip portion 16. The tip portion 16 is secured to the end of the shank portion 14 so that the grooves 24 and 34 are in longitudinal alignment. The grooves 24 and 34 are illustrated as being straight and this construction is preferred, but it is to be understood that is desired, they could be aligned so that they extend other than straight, for example helically, with respect to the body 12.

The passage 34 in the tip portion 16 has a pair of angularly related side walls 36 and 38, and the groove 34 is of a depth such that the side wall 38 extends past the axis 40 (FIG. 2) of the tip portion 16 which is also the axis of the drill body 12. The side wall 38 is also located so that intermediate its ends it's adjacent the axis 40 as shown in FIG. 2. The terminal end of the tip portion 16 is cut back so as to form a wall section 46 which is intermediate the terminal end of the tip portion and the shank portion 14. The terminal end of the tip portion 16 is formed with a cutting edge 48 which is aligned in a direction longitudinally of the drill body 12 with the wall seciton 46. Thus, an imaginary plane parallel to the axis 40 of the drill 10 and to one side of the groove 34 will intersect both the cutting edges 48 and the wall section 46.

As shown in FIG. 3, the cutting edge 48 is substantially V-shape having a point or apex 50 intermediate its ends. The drill 10 is a center-cut type drill, namely, a drill capable of forming a blind hole in a solid workpiece, as contrasted with a pin-cutting type drill which can be used only to drill openings completely through the workpiece, or a hole-enlarging tool which can be used only to enlarge an opening. Consequently, the cutting edge 48 extends to or slightly past the tip axis 40 as shown in FIG. 2 so that in all cases the cutting edge 48 intersects the axis 40.

A longitudinally extending fluid passage 52 is formed in the tip portion 16 and is located so that at one end it communicates with the passage 22 in the shank portion 14 and at the opposite end terminate in an orifice 56 located in the wall section 46 so that fluid under pressure issuing from the orifice 56 will be directed across the cutting edge 48. The orifice 56 is spaced a sufficient distance from the cutting edge 48 so that the stream of fluid issuing from the orifice 56 will spread out sufficiently to be directed over the full length of the cutting edge 48. The end of the passage 52 adjacent the orifice 56 controls the direction of the fluid discharged from the orifice 56 and is illustrated as being substantially tangent to a plane which includes the axis 40 and the cutting edge 48, but it is to be understood that the orifice 56 may be located above or below this plane. The illustrated location is preferred because it insures a supply of cooling fluid under pressure to the cutting edge 48.

The tip portion 16 is ground so that it is provided with wear lands or pads 58 are spaced about the periphery of the tip portion 16 and extend logitudinally thereof. The wear lands 58 are on a slightly larger diameter than the remainder of the tip portion 16 which is thus relieved between the wear lands 58 to reduce the friction between the side wall 28 of the hole 30 being drilled and the tip portion 16. The number and location of the wear lands 58 is a matter of choice depending on the particular use for which the drill 10 is intended, but it is desirable to locate at least two of the wear lands 58 on a diameter of the tip portion 16 to facilitate measuring of the diameter of the tip portion 16. It is also advisable to locate the wear lands 58 as close as possible to the edges of the groove 34 for strength purposes. The wear lands 58 bear against the side wall 28 of the drilled opening 30 and keep the drill centered in the opening.

The terminal end of the tip portion 16 is conveniently ground on straight lines extending in opposite directions from the point 50. As shown in FIG. 2, the terminal end of the tip portion is ground so that it has angularly related surfaces 60 and 62 which intersect along a line 64 that intersects the point 50. As a result, in use, the drill 10 forms a surface 66 at the inner end of the hole 30 being drilled, shaped so as to form an annular groove 68, the deepest point of which corresponds to the location of the drill point 50. As shown in FIG. 3, the tip surface portion 60 extends rearwardly of the drill 10 such that the surface 60 is always located in a spaced relation with the groove 68.

A second fluid passage 72 is formed in the tip portion 16 in communication with the passage 22 in the shank portion 14. The passage 72 terminates in a discharge orifice 74 located in the surface 60 in substantial alignment with the groove 68. By virtue of the location of the orifice 74 in the surface 60 and the alignment of the surface 60 with the groove 68, and further by virtue of the arrangement of the cutting edge 48 so that it extends into the groove 68, fluid discharged from the orifice 64 flows across the cutting edge 48 so that the orifice 64 is in continuous communication with the pocket 76 formed in the hole 30 between the wall section 46 and the cutting edge 48. The pocket 76 is bounded at its ends by the walls 46 and 66 and on one side by the hole wall 28. At its other side, the pocket 76 communicates with the groove 34. Thus, the provision of the discharge orifice 74 and particular location in the tip portion 16 enhances the fluid activity in the pocket 76. Rearwardly from the pocket 76, the tip portion 16 is formed with a surface 78 which intersects the wall section 46 and is inclined rearwardly and outwardly therefrom. The surface 78 cooperates with the hole wall 28 to form a passage 80 that communicates with the pocket 76 and is operable to relieve any pressures that might otherwise be created in the pocket 76 during use of the drill 10.

In use, either the drill 10 is rotated or the workpiece is rotated so that the drill 10 rotates about its axis 40 relative to the workpiece in a clockwise direction when viewed from the end that carries the head 22 or in a counterclockwise direction as viewed in FIG. 2 so that the cutting edge 48 engages the workpiece and acts to remove the metal therefrom. Concurrently with relative rotation of the drill 10 and workpiece 32, fluid under pressure is supplied to the passage 22 for flow therethrough and discharge as high velocity streams from the discharge orifices 56 and 74. Fluid discharged from the orifice 56 is directed across the full length of the cutting edge 48 so that it acts to break off chips as soon as they are formed thereby maintaining the chips of a minimum size. The broken-off chips are flushed out of the drilled hole 30 through the communicating passages 34 and 24 as soon as the chips are formed since the only place for the fluid issuing from the orifice 56 to flow is through the chip carrying passages 34 and 24.

This desired flow of chips is enhanced and stimulated by fluid flowing into the pocket 76 from the discharge orifice 74 and the provision of the additional passage 80 for chips to flow from the pocket 76. In addition, this additional fluid flow further insures chilling by the cooling fluid of the chips to prevent the chips from expanding under the influence of heat. Also, in the event stringy chips are formed, they are readily flushed through the passage 80 and into the communicating grooves 34 and 24 for quick removal from the pocket 76 thereby preventing any clogging of the orifice 56 by the chips.

From the above description it is seen that this invention provides an improved gun drill 10 in which the removal of chips from the cutting edge 48 is facilitated by the provision of the surface 78 on the tip portion 16, the surface 78 intersecting the wall section 46 at a location radially outwardly of the discharge orifice 56. The surface 78 is inclined so as to intersect the wall section 46 at a location spaced as far as possible from the hole wall 28 to thereby provide as large an opening as possible to the pocket 76. Flow of chips from the pocket 76 is further enhanced by the provision of the supplementary discharge orifice 74 and the continuous communication of the orifice 74 and the pocket 76.

What is claimed is:

1. A gun drill comprising a generally cylindrical body having a shank portion and a tip portion, said body having a longitudinally extending groove formed in the outer surface thereof extending the full length of said tip portion, the side walls of said groove in said tip portion being angularly related, the terminal end of said tip portion having a single cutting edge extending substantially radially thereof from one side surface thereof through the axis of said tip portion and terminating in a spaced relation with a diametrically opposite side surface thereof, said tip portion being formed intermediate the ends thereof with a wall section located to one side of said groove and in alignment with said cutting edge in a direction longitudinally of said body, and means forming a fluid passage in said body terminating at said wall section in an orifice positioned so that when fluid is supplied to said passage, said fluid is discharged from said orifice in a direction toward said cutting edge, said tip portion having a surface inclined axially of said drill and extending from said wall portion at a location radially outwardly of said orifice toward said shank portion, said surface and said cutting edge being located relative to said orifice so that said orifice is disposed between said surface and said cutting edge.

2. A gun drill according to claim 1, further including a second fluid passage in said body terminating at the terminal end of said tip portion in a second orifice located to one side of said cutting edge.

3. A gun drill according to claim 2 wherein the terminal end of said tip portion is shaped to provide for continuous communication of said second fluid discharge orifice and said cutting edge during use of said drill.

4. In a gun drill for forming a hole in a metal workpiece, a generally cylindrical rotatable body having a shank portion and a tip portion, said body having a longitudinally extending groove formed in the outer surface thereof extending the full length of said tip portion, the terminal end of said tip portion having a single cutting edge extending substantially radially thereof from one side surface thereof through the axis of said tip portion and terminating in a spaced relation with a diametrically opposite side surface thereof, said tip portion being formed intermediate the ends thereof with a wall section located to one side of said groove and in alignment with said cutting edge in a direction longitudinally of said body to thereby form a pocket in a hole being formed bounded on one side by the hole wall and at the ends by said wall section and the bottom of the hole, means forming a fluid passage in said body terminating at said wall section in an orifice positioned so that when fluid is supplied to said passage it is discharged from said orifice into said pocket so as to flush metal chips removed from said workpiece by said cutting edge into said groove, said tip portion having a surface inclined in a direction axially of said drill and extending from said wall section at a location radially outwardly of said orifice toward said shank portion, said surface cooperating with said hole wall to form a passage communicating with said pocket to enable chips to be flushed from said pocket into said passage and thence into said groove, said surface and said cutting edge being located relative to said orifice so that said orifice is disposed between said surface and said cutting edge, and means forming a second fluid passage in said body terminating in the terminal end of said tip portion in a second fluid discharge orifice communicating with said pocket.

5. A gun drill according to claim 4 wherein said terminal end of said tip portion has angularly related surfaces which intersect at a longitudinally outwardly projecting point on said cutting edge located to one side of said tip axis so that during drilling of said hole an annular groove is formed in said workpiece at the bottom of said hole, said second orifice being substantially aligned with said annular groove in a direction longitudinally of said body so that fluid can flow from said second orifice into said annular groove and thence into said pocket.

* * * * *